United States Patent [19]

Clemens

[11] Patent Number: 5,031,705
[45] Date of Patent: Jul. 16, 1991

[54] CROP-SENSING CULTIVATOR

[75] Inventor: Bernard Clemens, Wittlich, Fed. Rep. of Germany

[73] Assignee: Clemens und Co. Kommanditgesellschaft, Fed. Rep. of Germany

[21] Appl. No.: 521,859

[22] Filed: May 10, 1990

[30] Foreign Application Priority Data

May 24, 1989 [DE] Fed. Rep. of Germany ....... 3916852

[51] Int. Cl.$^5$ ............................................. A01B 63/32
[52] U.S. Cl. ......................................... 172/6; 172/233
[58] Field of Search ............... 172/2, 4, 5, 6, 233; 171/9; 56/10.4, DIG. 15; 367/96; 342/61

[56] References Cited

U.S. PATENT DOCUMENTS

| 3,776,316 | 12/1973 | Eberhart | 172/6 |
| 4,733,355 | 3/1988 | Davidson et al. | 172/4 |
| 4,835,691 | 5/1989 | Rotem et al. | 172/6 |

FOREIGN PATENT DOCUMENTS

| 2608049 | 9/1977 | Fed. Rep. of Germany | 367/96 |
| 2555860 | 6/1985 | France | 172/5 |
| 155116 | 5/1982 | German Democratic Rep. | 172/26 |
| 155117 | 5/1982 | German Democratic Rep. | 172/4 |
| 231185 | 12/1985 | German Democratic Rep. | 172/6 |
| 231270 | 12/1985 | German Democratic Rep. | 172/5 |
| 190113 | 12/1966 | U.S.S.R. | 172/6 |
| 1523065 | 11/1989 | U.S.S.R. | 172/5 |
| 2025665 | 1/1980 | United Kingdom | 367/96 |

Primary Examiner—Dennis L. Taylor
Assistant Examiner—Spencer K. Warnick
Attorney, Agent, or Firm—Ward Brown; Robert W. Beach

[57] ABSTRACT

A transmitter is mounted on a cultivator hitched to a tractor or the like for emitting a noninvasive sensor beam generally parallel to and in front of a soil-cultivating implement which tills the soil. Mechanism detects echoes from obstructions in the path of the implement and controls mechanism for retracting the implement so that the implement does not engage the obstructions. When an obstruction has passed, the implement is returned to its working position extending transversely to the direction of movement of the cultivator.

10 Claims, 5 Drawing Sheets

CROP-SENSING CULTIVATOR

BACKGROUND OF THE INVENTION

1. Field of the Invention

The present invention relates to a cultivator having mechanism for sensing an obstruction in the path of the soil-cultivating implement of the cultivator and mechanism for automatically retracting such implement so as not to engage the obstruction.

2. Prior Art

In a known cultivator, a soil-cultivating implement projects transversely of the direction of movement of such implement through the soil and a mechanical probe is positioned in front of the leading edge of the implement. When the probe engages against an obstruction, such as the agricultural crop being tended, rearward swinging movement of the implement is instituted. In such a known cultivator, however, the rearward movement of the soil-cultivating implement can be too slow so that the crop is damaged. In addition, the mechanical probe itself can damage the crop.

SUMMARY OF THE INVENTION

The principal object of the present invention is to provide a novel crop-sensing cultivator of the type having a soil-cultivating implement and mechanism for moving the implement out of the path of an obstruction, such as the agricultural crop being tended.

In the preferred embodiment of the present invention, the foregoing object is accomplished by providing such a cultivator with a transmitter for emitting a noninvasive sensor beam toward a predetermined location in front of the cultivating implement, mechanism for detecting echoes from obstructions in the path of the implement, and mechanism controlled by the detecting mechanism for retracting the implement so that the implement does not engage the obstruction.

Preferably, the sensor beam is radiated approximately parallel to and in front of the leading edge of the soil-cultivating implement, and the height and angle of the beam relative to the implement can be adjusted to adapt the cultivator for tending different types of crops.

The echo-detecting mechanism can be coupled to a fluid pressure jack actuated upon detection of an obstruction to permit the implement to swing rearward away from the obstruction. When the obstruction has past, the jack is actuated to return the implement to its working position.

Preferably, the implement can be moved up and down to adjust its depth beneath the soil. A second transmitter and detector can be provided to sense the position of the implement. Such transmitter and detector can be coupled with mechanism for raising and lowering the implement so as to maintain a predetermined depth.

DETAILED DESCRIPTION

Figure 1:
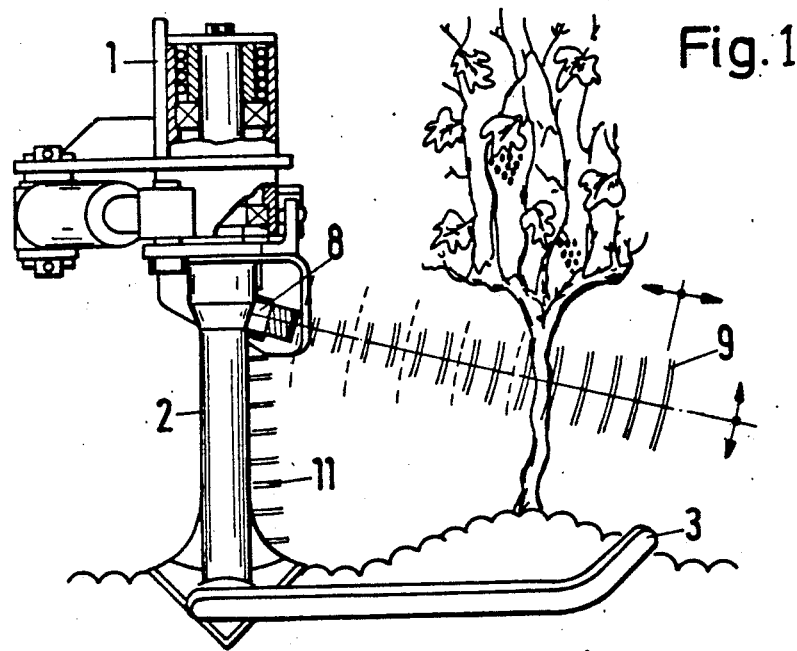
FIG. 1 is a diagrammatic rear elevation of a crop-sensing cultivator in accordance with the present invention with parts broken away and parts deleted, illustrating use of such cultivator adjacent to a first type of crop.

With reference to FIG. 1, the crop-sensing cultivator in accordance with the present invention includes a support frame 1 that can be hitched to a tractor or the like to move the cultivator to till the soil. Frame 1 rotatably supports an upright shaft 2. A soil-cultivating implement 3, such as a blade, extends substantially radially from the drive shaft 2 and is secured for rotation with the shaft. The normal working position of the implement 3 is illustrated FIG. 4. In such position, the blade extends transversely to the direction of travel of the cultivator indicated by the arrow 13.

Figure 4:
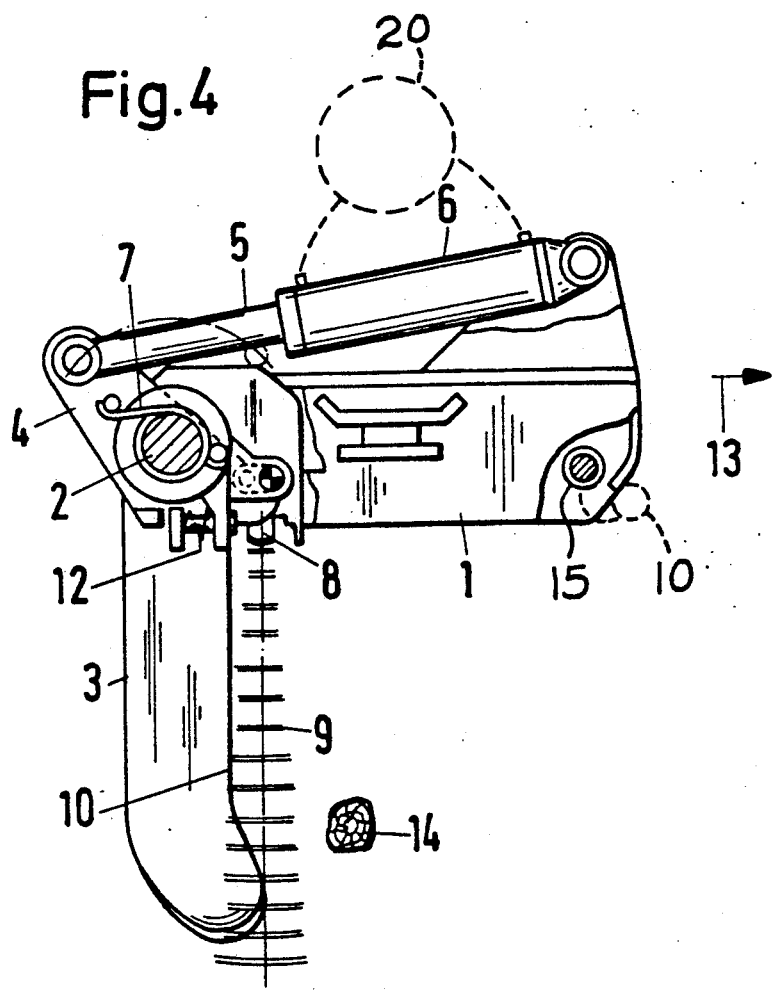
FIG. 4 is a diagrammatic top plan of the cultivator of FIG. 1, illustrating the working position of the cultivator as it approaches an obstruction.

With reference to FIG. 4, a crank arm 4 projects from the shaft 2 on which the implement 3 is supported. The plunger 5 of a fluid pressure jack 6 is connected to the crank arm. The cylinder of the jack is pivotally supported on the frame 1. A torsion spring 7 biases the crank arm toward the cylinder of the jack 6, but normally the crank arm is maintained in the working position shown in FIG. 4 by the extended plunger 5.

Figure 2:
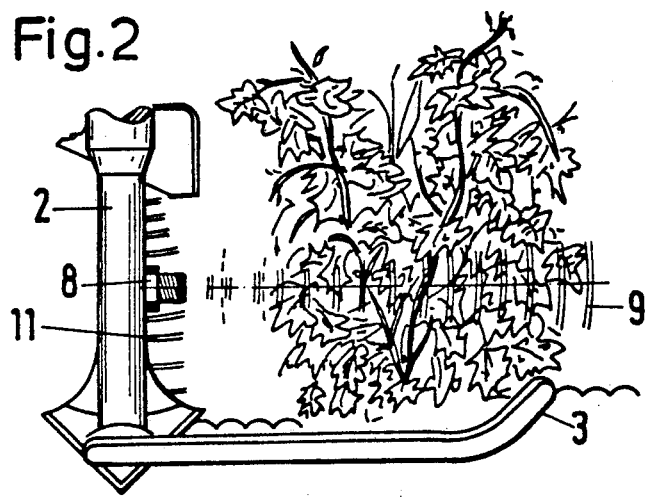
FIG. 2 is a diagrammatic rear elevation of the cultivator of FIG. 1 with parts in different positions and parts deleted, illustrating use of the cultivator adjacent to a second type of crop.
Figure 3:
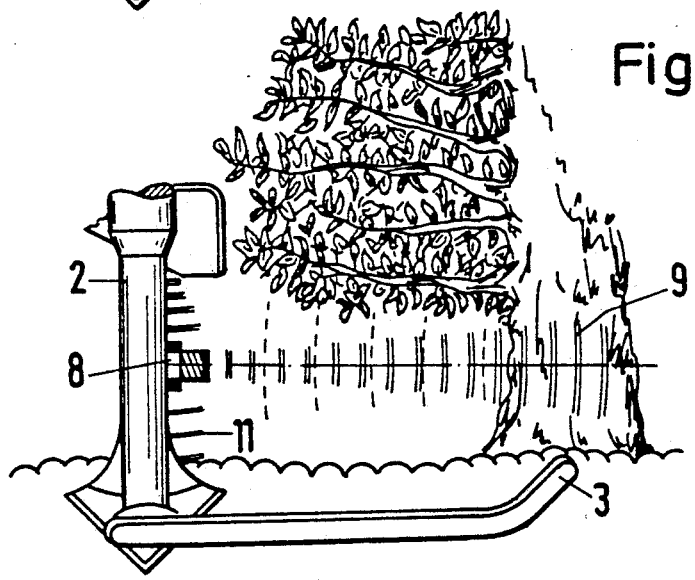
FIG. 3 is a corresponding rear elevation of the cultivator of FIG. 1 with parts deleted, illustrating use of the cultivator adjacent to a third type of crop.

A transmitter such as an ultrasound transducer 8 is supported from the drive shaft 2 in position to project a sensor beam 9 in a plane parallel to and spaced in front of the leading edge of the implement 3. As represented in FIGS. 1, 2 and 3, preferably the height and angle of inclination of the transducer 8 can be adjusted to adapt the cultivator for tending different types of crops. FIG. 1 illustrates one possible direction of transmission of the sensor beam for detecting the stem of a vine on a raised row. FIG. 2 illustrates a different attitude of transmission for detecting the base of a bush. FIG. 3 illustrates transmission of the sensor beam beneath the bottom branches of a tree for detecting the position of the trunk.

As shown in FIGS. 1, 2 and 3, the sensor beam 9 is emitted generally horizontally above the ground to impinge directly on the obstruction.

In the preferred embodiment an ultrasound sensor beam is transmitted, but beams of different types could be utilized such as infrared, laser or radar.

Figure 5:
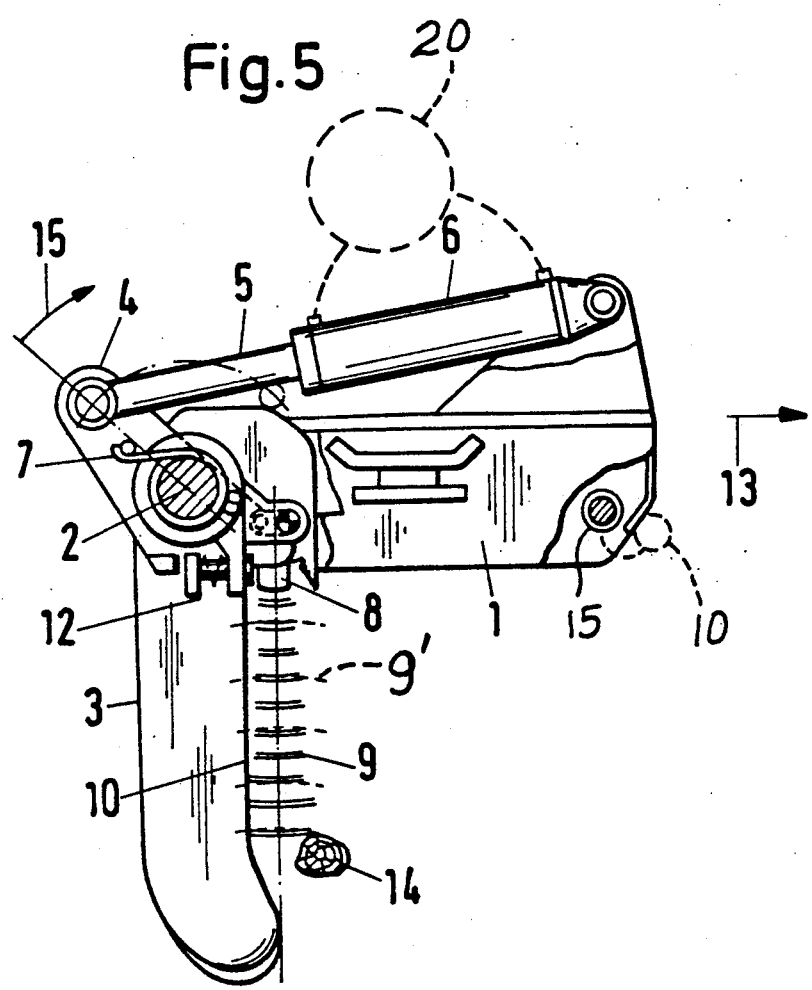
FIG. 5 is a corresponding top plan illustrating detection of the obstruction as the cultivator moves toward it.
Figure 6:
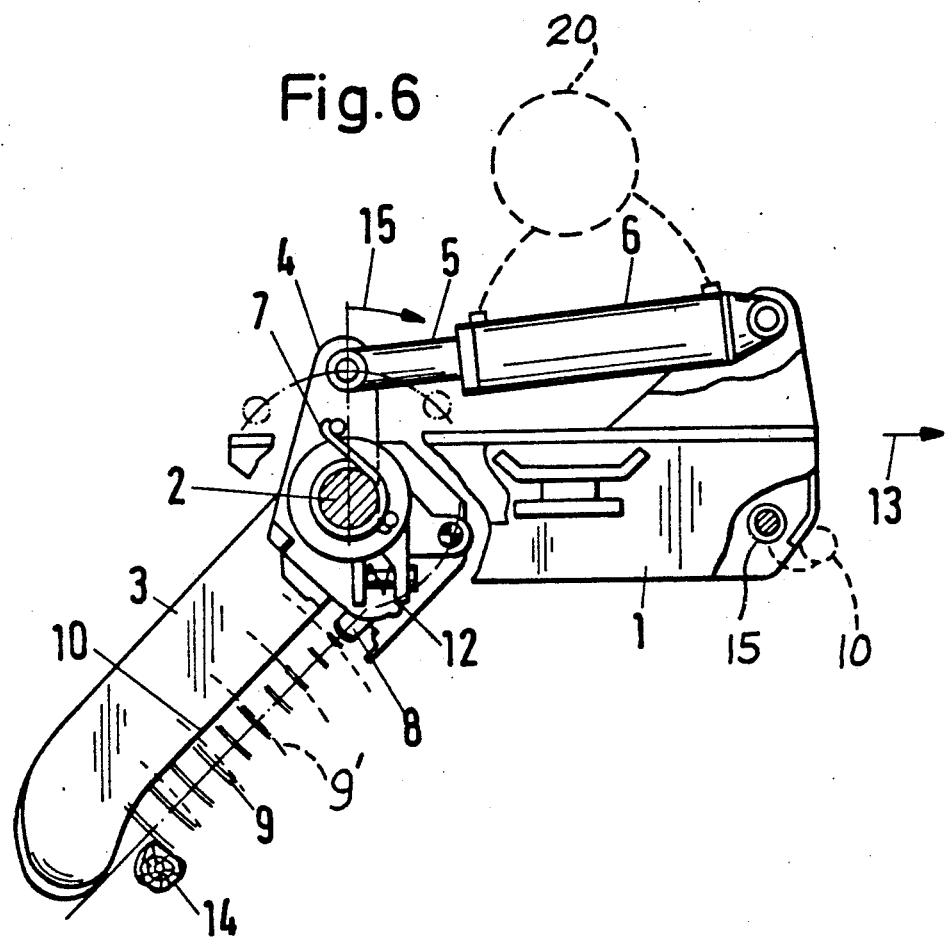
FIG. 6 is a corresponding top plan illustrating rearward swinging of the soil-cultivating implement of the cultivator so as to avoid engagement with the obstruction.
Figure 7:
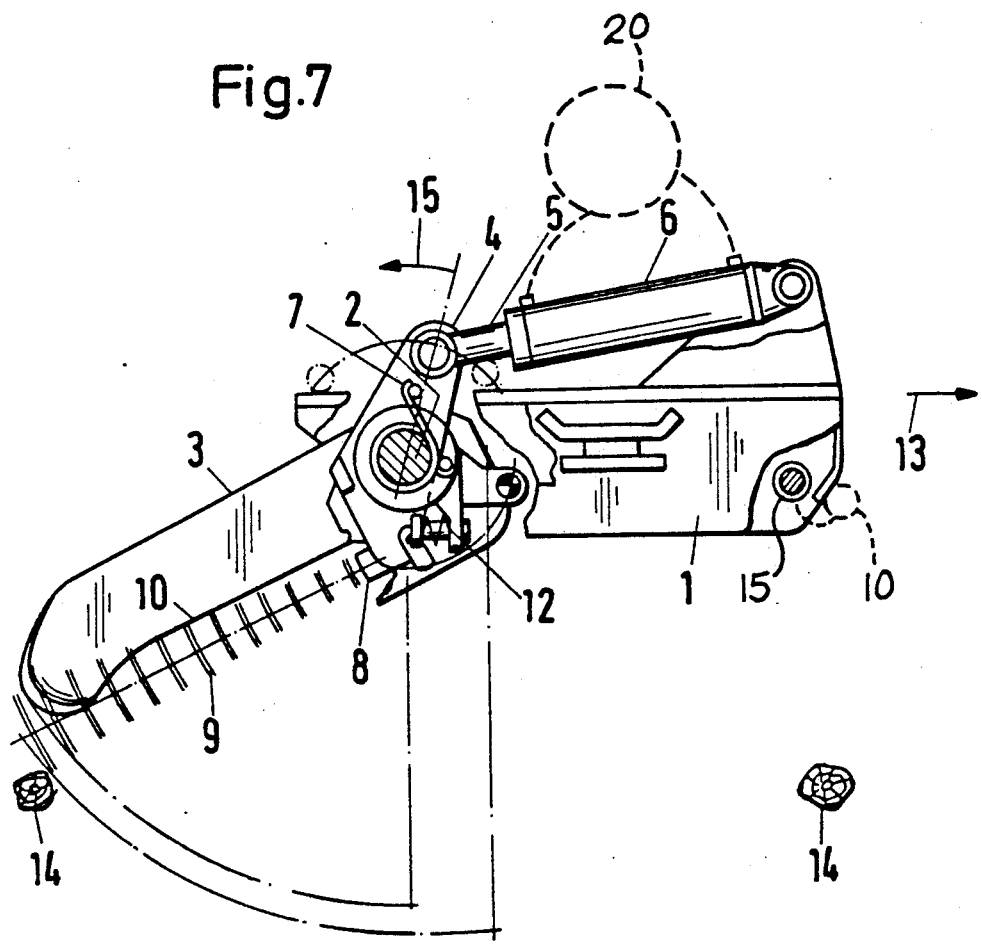
FIG. 7 is a corresponding top plan illustrating return of the soil-cultivating implement toward its working position after passing the obstruction.

Preferably, the transducer 8 transmits short pulses of sensor beam at uniformly spaced intervals and detects echoes from obstructions in the path of the beam. The transducer 8 is coupled to control mechanism 20 which analyzes the echoes and controls operation of the fluid pressure jack 6. In the normal working position of the implement 3 illustrated in FIG. 4, an electric solenoid valve is closed to lock the jack with its plunger 5 in extended position to maintain the implement extending transversely to the direction of travel indicated by the arrow 13. As represented in FIGS. 5 and 6, if an obstruction is sensed by detection of returning echoes 9', such as the base 14 of a vine, the ports of the jack cylinder are opened and, by the action of the torsion spring 7 and the resistance of the implement 3 to movement through the soil, the implement is automatically retracted away from the obstruction 14 by swinging rearward relative to the frame 1. The jack ports remain open so long as the obstruction is sensed. With reference to FIG. 7, when the obstruction has cleared the implement 3 sufficiently that the obstruction will not be engaged by forward swinging of the implement, the jack 6 is actuated to extend its plunger to return the implement to its working position. With reference to FIG. 4, a limit switch 12 can be provided to sense when the implement has returned to its working position, whereupon the ports to the jack cylinder are closed, thereby locking the implement in its working position until another obstruction is sensed.

The control mechanism 20 can be adjusted to adjust the effective length of the sensor beam, i.e., the maximum distance from the transmitter to the obstruction in order for detecting echoes from the obstruction to result in automatic retraction of the soil-cultivating implement. Preferably, only obstructions in or close to the path of the implement 3 through the soil actuate retraction of the implement. By transmitting short pulses of ultrasound or equivalent beams, the control mechanism can be adjusted to open the ports of the jack cylinder only when echoes are detected within a predetermined period following transmission of a pulse. The effective length of the beam should be adjusted to be at least slightly longer than the length of the implement 3.

In an alternative embodiment, the jack 6 can be double-acting and the control mechanism can actuate the jack to retract its plunger 5 to effect the rearward swinging of the implement 3 when an obstacle is detected.

An additional transmitter 10 (shown diagrammatically in FIGS. 4, 5, 6 and 7) can be provided to transmit a sensor beam 11 (illustrated in FIGS. 1, 2 and 3) downward into contact with the soil. Echoes of beam 11 are analyzed by the control mechanism to calculate the distance between the additional transmitter and the top of the soil, which also provides an indication of the depth of the cultivating implement 3 below the soil. With reference to FIG. 4, such additional transmitter and its echo-detecting element can be mounted on a stationary part of the frame 1 along with a second, upright fluid pressure jack 15 effective to raise and lower the shaft 2 and, consequently, the implement 3 carried by the shaft. The second transmitter-detector can control operation of the second cylinder so as to maintain a desired depth of the implement 3.

I claim:

1. In a cultivator, movable along the ground in a working direction and having a support frame, a soil-cultivating implement mounted on the frame for rotation about an upright axis and having a leading edge normally extending generally transversely to the working direction, means for sensing an obstruction in the path of movement of the soil-cultivating implement and means for automatically effecting retraction of the soil-cultivating implement relative to the frame upon sensing of the obstruction so that the soil-cultivating implement does not engage the obstruction, the improvement comprising the sensing means including transmitter means for emitting a noninvasive sensor beam generally horizontally above the ground in a plane approximately parallel to and in front of the leading edge of the soil-cultivating implement in the working direction and for detecting echoes from the obstruction to sense the position of the obstruction, said transmitter means controlling operation of the retraction means and being mounted for rotation with the soil-cultivating implement.

2. In the cultivator defined in claim 1, the effective length of the sensor beam emitted by the transmitter means being adjustable for controlling the maximum distance from the transmitter means to the obstruction in order for detecting echoes from the obstruction to result in automatic retraction of the soil-cultivating implement.

3. In the cultivator defined in claim 1, the effective length of the sensor beam being longer than the length of the leading edge of the soil-cultivating implement.

4. In the cultivator defined in claim 1, the transmitter means being mounted at a level above the soil-cultivating implement, and the height of the transmitter means above the soil-cultivating implement being adjustable.

5. In the cultivator defined in claim 1, the retraction means including a fluid pressure jack operable to rotate the soil-cultivating implement about an upright axis.

6. In the cultivator defined in claim 5, the retraction means including an electric solenoid valve controlling supply of fluid under pressure to the fluid pressure jack and means for opening said valve when an obstruction is detected.

7. In the cultivator defined in claim 5, the fluid pressure jack normally maintaining the implement with its working edge extending transversely to the working direction but being releasable to permit retraction of the soil-cultivating implement in a direction generally opposite the working direction relative to the frame.

8. In the cultivator defined in claim 5, the control means normally locking the fluid pressure jack in position to maintain the soil-cultivating implement extending generally transversely to the working direction until an obstruction is sensed.

9. In the cultivator defined in claim 1, means for returning the soil-cultivating implement to a position extending transversely to the working direction, and means for detecting when the soil-cultivating implement has reached such position.

10. In the cultivator defined in claim 1, the soil-cultivating implement being mounted on the frame for vertical movement relative to the frame, and including second transmitter and detector means for sensing the vertical position of the implement relative to the frame and for adjusting the vertical position of the implement relative to the frame.

* * * * *